United States Patent [19]

Coy et al.

[11] 4,408,506
[45] Oct. 11, 1983

[54] MACHINE FOR PRECISELY FEEDING AND TURNING AN AXIALLY MOVABLE NON-ROTATING WORKPIECE

[75] Inventors: Donald L. Coy; Dale L. McEvers, both of Dayton, Ohio

[73] Assignee: H & H Industries, Inc., Dayton, Ohio

[21] Appl. No.: 253,706

[22] Filed: Apr. 13, 1981

[51] Int. Cl.³ .............................................. B23B 5/00
[52] U.S. Cl. ......................................... 82/20; 82/2.5
[58] Field of Search .............................. 82/20, 2.5, 2.7

[56] References Cited

U.S. PATENT DOCUMENTS

| | | | |
|---|---|---|---|
| 456,882 | 7/1891 | Brightman | 82/20 |
| 2,311,998 | 2/1943 | Pope | 82/20 |
| 2,328,002 | 8/1943 | Gall et al. | 82/20 |
| 2,575,116 | 11/1951 | Murray | 82/20 |
| 2,619,174 | 11/1952 | Neale | 82/20 |
| 2,655,066 | 10/1953 | Siegerist | 82/20 |
| 3,750,497 | 8/1973 | Goeke et al. | 82/20 |

Primary Examiner—W. D. Bray
Attorney, Agent, or Firm—Jacox & Meckstroth

[57] ABSTRACT

A turning head having a rotatably supported annular spindle with angularly arranged cutting tool elements, receives non-rotating elongated cylindrical workpieces which are successively fed through the turning head by a set of roller feed units. Each feed unit includes a pair of parallel spaced and simultaneously driven feed rollers which are supported for simultaneous lateral movement by corresponding arms pivotally supported on parallel spaced axes. The arms are simultaneously pivoted between predetermined selectable limits by a power operated actuating lever which engages both arms. The spindle is provided with a belt drive sheave disposed adjacent the tool elements and receives a removable non-rotating internal sleeve which supports an interchangeable bushing for precisely guiding the workpiece after being turned to a precise diameter. The sleeve also has passages for supplying a cooling fluid directly to the tool elements, and the turning head is supported between two of the roller feed units by a transversely extending guideway which enables the turning head to be quickly retracted for service.

20 Claims, 8 Drawing Figures

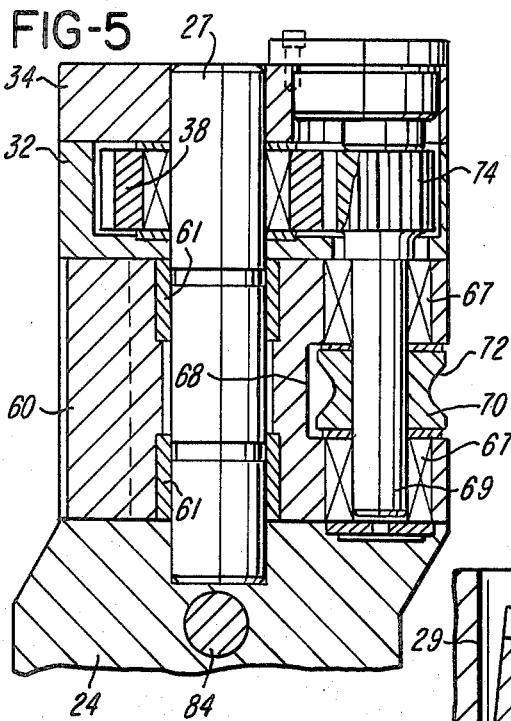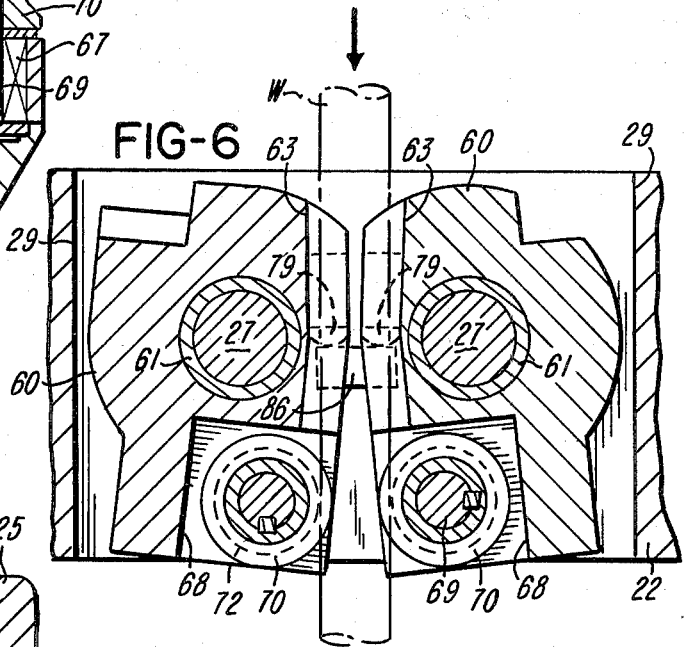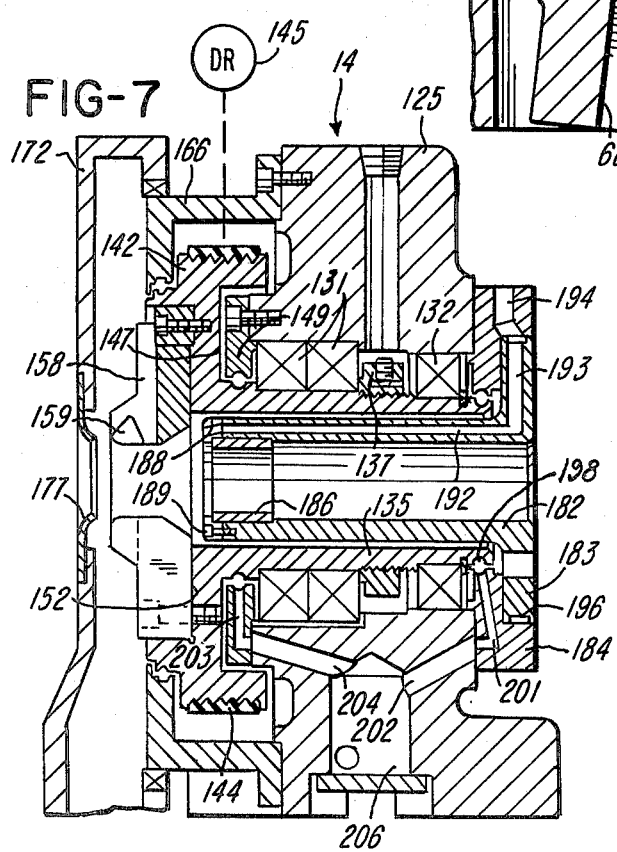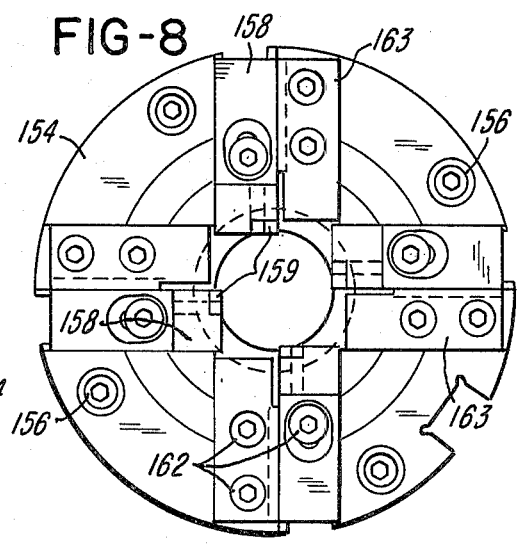

MACHINE FOR PRECISELY FEEDING AND TURNING AN AXIALLY MOVABLE NON-ROTATING WORKPIECE

BACKGROUND OF THE INVENTION

In the art of bar peeling or turning machines, rolling skins or surface deformations or cracks are removed from cylindrical workpieces such as hot-roll bars, billets or tubes, by automatically feeding the workpieces in an axial direction through a centerless peeling machine. A surface layer, usually varying between 0.008 and 0.100 inch, is peeled or turned from each workpiece, according to the diameter of the workpiece which generally ranges between 0.31 inch and 4.72 inches. One such peeling machine is manufactured by Sandvik, Inc. under the trademark "Coromant". In this machine, a rotating annular peeling head carries a set of angularly disposed cutting tools, and the cylindrical workpieces are successively fed through the head on its axis by sets of feed rollers located on opposite sides of the head. The feed rollers are supported by corresponding radially adjustable blocks, and some of the blocks are biased inwardly by springs which exert sufficient force to prevent rotation of each workpiece.

SUMMARY OF THE INVENTION

The present invention is directed to an improved machine or apparatus for rapidly and precisely turning cylindrical workpieces and for successively feeding the workpiece axially on a center axis. The machine of the invention is adapted to receive workpieces which vary slightly in diameter and to feed and turn each workpiece to a precision diameter within very small tolerances. The machine of the invention is also constructed to provide for extended and dependable operation in order to minimize any down time of the machine for servicing. The turning machine of the invention is further adapted to be conveniently and quickly changed for receiving and precisely feeding and machining workpieces of different diameters.

In accordance with one embodiment of the invention, the above features and advantages are provided by a set of roller feed units which successively feed cylindrical workpieces through a turning head located between two of the feed units. Each feed unit includes a pair of opposing feed rollers spaced on parallel axes to receive each workpiece therebetween, and each pair of feed rollers are supported by corresponding pivot arms or members which are, in turn, supported for pivotal movement on parallel spaced axes so that the spacing between each pair of rollers may change to receive workpieces varying in diameter. The feed rollers of each feed unit are simultaneously driven and simultaneously moved with respect to the centerline of the machine by a lever actuated by a fluid cylinder. The turning head of the machine incorporates an annular spindle which supports angularly arranged cutting tool elements disposed adjacent a multiple V-belt drive. The spindle surrounds a non-rotating sleeve which directs a cooling fluid to the tool elements and may be conveniently and quickly removed from the spindle for interchanging an internal workpiece support bushing selected according to the precisely turned diameter of the workpiece.

Other features and advantages of the invention will be apparent from the following description, the accompanying drawing and the appended claims.

BRIEF DESCRIPTION OF THE DRAWINGS

FIG. 5 is a fragmentary section taken generally on the line 5—5 of FIG. 2;

FIG. 6 is a fragmentary section taken generally on the line 6—6 of FIG. 3;

FIG. 7 is a vertical axial section through the turning head shown in FIG. 1; and FIG. 8 is an end view of the spindle and cutting tool elements shown in FIG. 7.

DESCRIPTION OF THE PREFERRED EMBODIMENT

Figure 1:
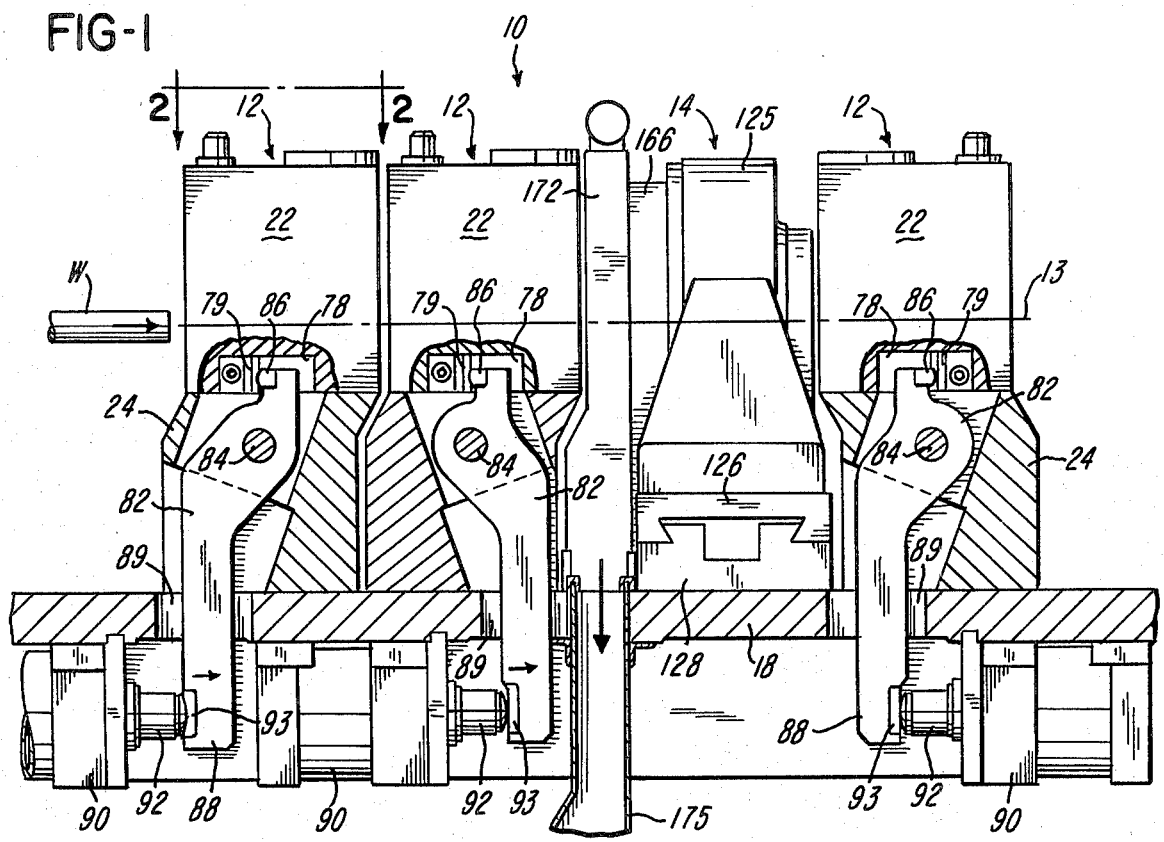
FIG. 1 is a side elevational view of a turning machine constructed in accordance with the invention and with a portion of each roller feed unit broken away.

FIG. 1 shows a centerless turning machine 10 which includes a set of three roller feed units 12 aligned on a horizontal axis 13 and arranged to receive a turning head 14 between two of the feed units 12. All of the roller feed units 12 and the turning head 14 are supported by a metal base 18 and are adapted to receive a series of cylindrical workpieces W which are successively fed into the machine on the center axis 13. As mentioned above, the workpieces W may consist of hot-rolled bars, billets or tubes having a cylindrical outer surface and may be of practically any length, provided each workpiece W is substantially straight and of substantially uniform diameter. The machine 10 is particularly suited for feeding each workpiece W at a relatively high speed, for example, 20 to 30 feet per minute and for turning each workpiece W to a precision diameter, for example to within a tolerance of ±0.001 inch or ±0.025 mm.

Since the roller feed units 12 are substantially identical in construction, only one of the units will be described in detail in connection with FIGS. 2–6. Accordingly, each of the feed units 12 includes a metal housing 22 having a lower section 24 mounted on the base 18. The housing 22 supports the lower end portions of a pair of non-rotating shafts 27 (FIGS. 2 and 3) which project upwardly through a cavity 29 defined within the housing 22. The upper end portions of the parallel shafts 27 project through a top plate 32 and a cover plate 34 which mount on the housing 22 and are secured by a series of screws 36. A pair of meshing gears 38 are supported for rotation by corresponding anti-friction bearings 39 mounted on the shafts 27, and the gears 38 are located within a cavity 41 formed within the top plate 32. The cover plate 34 has holes which support the upper end portions of the non-rotating shafts 27.

The gears 38 are driven through a transfer gear 43 which is supported by an anti-friction bearing mounted on a non-rotating shaft 46 supported by the plates 32 and 34. The transfer gear 43 also engages a drive pinion 48 which is mounted on the upper end portion of a vertical drive shaft 51 supported by a set of anti-friction bearings 52 confined within the housing 22. The lower end portion (not shown) of the drive shaft 51 to each roller feed unit 12 is connected to a common variable speed electric motor drive 55 so that the gears 38 within each of the roller feed units 12 are driven at precisely the same selected speed.

A pair of pivot members or arms 60 are located within the recess 29 within the housing 22 and are supported for pivotal movement on parallel axes by sets of bearings 61 mounted on the corresponding shafts 27. The arms 60 have opposing semi-cylindrical recesses 63 (FIG. 3) which are concentric with the center axis 13 and through which a workpiece W is directed. Each of the pivot arms 60 carries a set of anti-friction bearings 67 (FIG. 5) located above and below a recess 68, and each set of bearings 67 supports a rotary shaft 69.

A feed roller 70 is rigidly mounted on each shaft 69 within the recess 68 of the corresponding pivot arm 60, and each feed roller 70 has a V-shaped circumferential groove 72. A pinion 74 is mounted on the upper end of each shaft 69 and meshes with the corresponding gear 38 supported by the adjacent non-rotating shaft 27. As a result of the drive train through the gears 48, 43, 38 and 74, both of the feed rollers 70 are driven by the drive motor 55 at precisely the same speed even while the spacing between the pair of feed rollers 70 changes in response to pivoting of the support arms 60.

Figure 3:
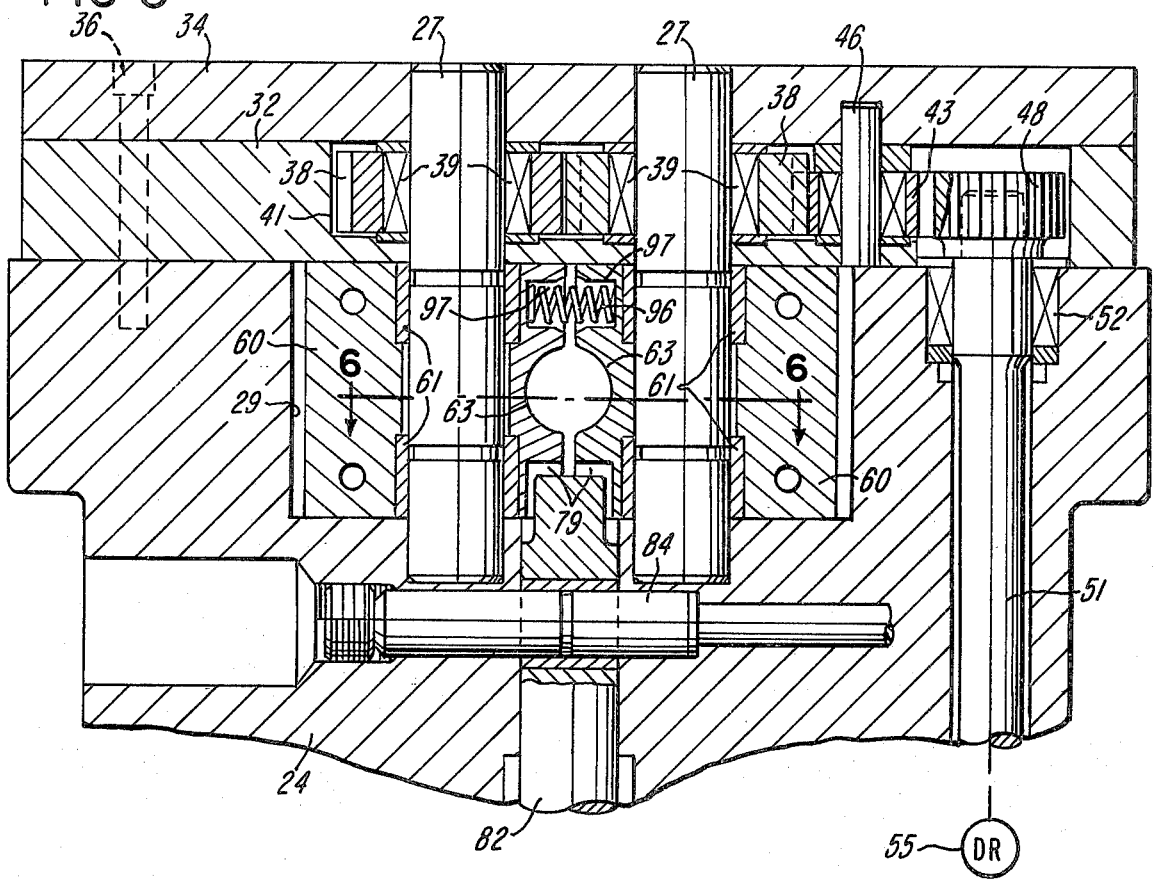
FIG. 3 is a fragmentary vertical section taken generally on the line 3—3 of FIG. 2.

As shown in FIGS. 1, 3 and 6, the lower portions of the pivot arms 60 are provided with opposing recesses 78 which receive a set of hardened steel pads 79 having rounded outer surfaces located normally within a plane defined by the axes of the shafts 27. An actuating lever 82 (FIG. 1) is pivotally supported within the lower section 24 of each roller feed unit 12 by a cross shaft 84, and the upper end portion of the lever 82 projects upwardly into the recesses 78 within the lower portions of the pivot arm 60. A hardened steel pad 86 is secured to the upper end portion of the lever 82 and engages the rounded surfaces of the hardened steel pads 79 mounted on the pivot arms 60. The actuating lever 82 has a lower end portion 88 which projects downwardly through an opening 89 formed within the base 18. A pneumatic or fluid cylinder 90 is mounted on the bottom of the base 18 and has an actuating piston rod 92 which engages a hardened steel pad 93 mounted on the lower end portion 88 of the lever 82.

Figure 2:
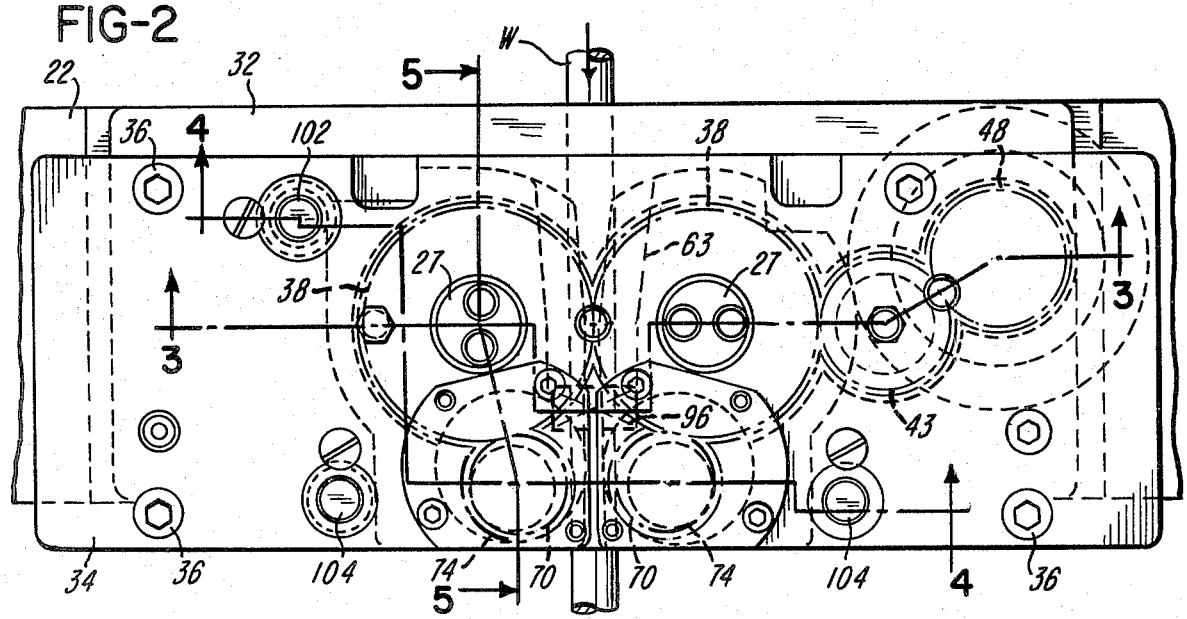
FIG. 2 is a plan view of one of the roller feed units and taken generally on the line 2—2 of FIG. 1.

When pressurized air is supplied to the cylinder 90, the piston rod 92 is extended so that the lever 82 pivots in a direction (FIG. 1) for simultaneously pivoting the pivot arms 60 and simultaneously moving the feed rollers 70 closer together with respect to the center axis 13. When urged together, the rollers 70 grip and feed a cylindrical workpiece W being directed between the feed rollers 70. As shown in FIGS. 2 and 3, a compression spring 96 is confined within opposing bores 97 formed within the pivot arms 60 between the corresponding shafts 27 and 69. Thus when the hydraulic fluid supplied to the cylinder 90 is released, the spring 96 pivots the arm 60 and the lever 82 in their opposite directions in order to increase the spacing between the feed rollers 70 and release the gripping of the workpiece.

Figure 4:
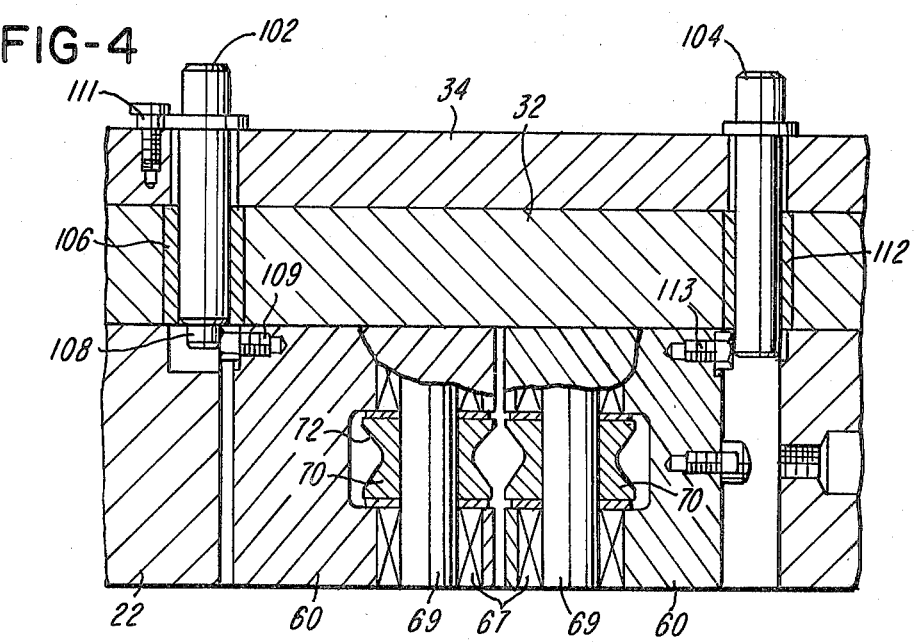
FIG. 4 is a fragmentary section taken generally on the line 4—4 of FIG. 2.

Referring to FIGS. 2 and 4, the limits of movement for each pivot arm 60 and thus the limits of movement for the pair of feed rollers 70, are controlled or determined by a set of stop pins 102 and 104 for the pivot arms. The stop pin 102 (FIG. 4) is supported by a bushing 106 mounted within the top plate 32 and includes a smaller diameter lower end portion 108 which engages the head of a screw 109 threaded into the corresponding pivot arm 60. The stop pin 102 is retained by shoulder engaging screw 111. When it is desired to change the minimum spacing between the axes of the feed rollers 70 on opposite sides of the center axis 13, stop pin 102 is replaced with another stop pin having a lower end portion 108 of a different diameter.

The two stop pins 104 (FIG. 4) are similarly supported by corresponding bushings 112 within the top plate 32 and have lower end portions which engage corresponding screws 113 secured to the pivot arm 60. When it is desired to change the maximum spacing between the axes of the feed rollers 70, the two stop pins 104 are replaced with another set of stop pins having lower end portions of reduced diameter so that the maximum spacing between the feed rollers 70 is increased.

As apparent from the above description in connection with the roller feed units 12 shown in FIGS. 1-6, the simultaneously driven feed rollers 70 are urged inwardly for positively gripping each workpiece W when the corresponding pneumatic cylinder 90 is actuated by receiving a supply of pressurized air. When the fluid pressure is released, the pair of opposing feed rollers 70 move outwardly to release the workpiece. The common actuating lever 82 for each feed unit 12 assures that the pivot arms 60 and feed rollers 70 move simultaneously relative to the center axis 13 so that each workpiece is maintained in precise alignment with the center axis 13 regardless of variations in diameter of the workpieces.

The two roller feed units on the left (FIG. 1) or upstream of the turning head 14 assure that each cylindrical workpiece is precisely centered and aligned with the axis 13. The support of each workpiece by the two sets of driven feed rollers 70 also assures positive feeding of each workpiece and prevents rotation of the workpiece during the turning operation. The single roller feed unit 12 to the right or downstream of the turning head cooperates with the turning head to maintain the alignment of the workpiece and to prevent rotation of the workpiece while also feeding the workpiece through the head.

Referring to FIGS. 1, 7 and 8, the turning head 14 includes a housing 125 which is mounted on the top section 126 of a dove-tail cross slide 128 secured to the base 18. The housing 125 supports a set of anti-friction bearings 131 and 132 which, in turn, supports a tubular spindle 135. The bearings 131 are secured to the spindle 135 by a lock ring 137 threaded onto the spindle. The spindle 135 includes an integrally formed enlarged head portion 142 which functions as a fly wheel and is provided with multiple "V" grooves for receiving an endless multiple "V"-belt 144 driven by a variable speed electric motor 145 located laterally of the turning head. An annular recess 147 is formed within the inner surface of the spindle head portion 142 and receives an annular ring 149 which is secured to the housing 125.

A cylindrical recess 152 is formed within the outer surface of the spindle head portion 142 and receives a circular plate 154 (FIGS. 7 and 8) which is secured to the head portion 142 by a set of screws 156. The plate 154 supports a set of four cutting tools 158 on which are mounted carbide cutting elements 159. The tools 158 are positively secured to the plate 154 by corresponding screws 162 and clamping plates 163. A sub-assembly of the spindle plate 154 and cutting tools 158 is shown in FIG. 8, and the precise positioning of the cutting tool elements 159 is made when the turning head 14 is retracted laterally on the dove-tail cross slide 128, as will be explained later.

The spindle head portion 142 is enclosed within a casing or housing 166 which is secured to the housing 125. The housing 166 has a slot through which the drive belt 144 projects and also supports a chip and coolant confining housing 172. As shown in FIG. 1, the housing 172 aligns vertically with a chute 175 which directs the chips to a chip removing conveyor (not shown). As shown in FIG. 7, the outer wall of the housing 172 supports an annular flexible sealing ring 177 which engages and slides on the outer surface of each workpiece W as the workpiece is fed into engagement with the cutting elements 159.

A non-rotating tubular sleeve 182 extends into the spindle 135 and has an outer flange portion 183 which is secured to an annular bearing enclosure plate 184 mounted on the housing 125. The forward end portion of the tubular sleeve 182 supports a cylindrical guide bushing 186 which is retained by a ring 188 and a set of screws 189 threaded into the sleeve 182. The inner cylindrical surface of the bushing 186 is precisely machined according to the desired finished or turned diameter of each workpiece so that the bushing 186 serves as a precision guide for each workpiece after it is turned and cooperates with the adjacent feed unit 12 to maintain axial alignment of each turned workpiece.

The non-rotating tubular sleeve 182 is also provided with axially extending passages 192 which connects with corresponding radial passages 193 in the outer flange portion 183. A recirculating cooling oil or fluid is supplied to the passages 193 through a radial passage 194 within the ring 184 and a circumferential groove 196 within the flange portion 183. The cooling fluid is directed from the passages 192 directly onto the corresponding cutting elements 159. The bearings 131 and 132 are grease sealed for life. Air is supplied to the cavity 206 in the housing 125 and passes through passages 201-204 to form an air purge barrier which cooperates with the slinger grooves 198 to keep the coolant and contaminates out of the spindle bearings.

As mentioned above, the turning head 14 provides for precisely machining each cylindrical workpiece W to a precision predetermined diameter which is substantially the same as the inner diameter of the guide bushing 186. When it is desired to change this diameter by replacing the bushing 186, the cross slide 128 provides for quickly moving the turning head 14 laterally to a position where the sleeve 182 may be conveniently removed for replacing the bushing 186 and where the cutting tools 158 may be conveniently adjusted. The cross slide 128 also permits quick replacement of the drive belt 144 in the event the belt becomes worn or breaks. The non-rotating sleeve 182 also provides for recirculating a cooling fluid through the spindle 135 and directly onto the cutting element 159 so that both a precision turned surface and a maximum axial feed rate may be obtained.

While the form of turning apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. A machine adapted for precisely turning a cylindrical workpiece to a predetermined outside diameter, said machine comprising a forming head including an annular spindle supported for rotation on an axis, a plurality of angularly spaced tool elements mounted on said spindle for engaging the workpiece, means for driving said spindle, a plurality of workpiece feeding units spaced axially with said forming head disposed between two said feeding units, each of said feeding units including a pair of opposing feed rollers spaced to receive a workpiece therebetween, a pair of pivot members supporting said feed rollers for rotation on parallel spaced axes, means supporting said pivot members for pivotal movement on parallel spaced axes eccentric to the corresponding said axes of said feed rollers for changing the spacing between said feed rollers, means for simultaneously driving said feed rollers while said pivot members are pivoting, and a power actuated member disposed for simultaneously engaging and pivoting said pivot members in opposite directions while said feed rollers are driven to effect movement of said driven feed rollers between corresponding retracted positions and workpiece gripping positions for feeding the workpiece through said forming head in precise alignment with the axis of said spindle.

2. A machine as defined in claim 1 wherein said pair of feed rollers of each said feed unit are secured to corresponding parallel shafts rotatably supported by the corresponding said pivot members, and said means for driving said feed rollers comprise a pair of driven gears secured to said shafts and meshing with corresponding driving gears supported for rotation on the pivot axis of said piviot members, and a motor connected to drive one of said driving gears.

3. A machine as defined in claim 2 and including a drive shaft extending parallel to said pivot axes of said pivot members, and said motor is connected to drive said drive shaft.

4. A machine as defined in claim 3 wherein each said pivot member of each said feeding unit is engaged by said power actuated members generally adjacent a plane defined by the parallel spaced pivot axes of said pivot members.

5. A machine as defined in claim 1 wherein said power actuated member comprise a fluid cylinder actuated lever effective to urge said pivot members and the corresponding feed rollers towards said workpiece gripping positions, and spring means urging said pivot members and said feed rollers towards said retracted positions.

6. A machine as defined in claim 1 wherein said power actuated member for pivoting said pivot members of each said feeding unit comprises a lever supported for pivotal movement, said lever having a portion disposed for engaging said pivot members, and a fluid actuated cylinder for pivoting said lever.

7. A machine as defined in claim 1 wherein each of said feed units includes means for limiting the simultaneous movement of said pivot members.

8. A machine as defined in claim 7 wherein said limiting means comprise interchangeable stop pins for stopping said pivot members.

9. A machine as defined in claim 1 wherein said forming head comprises a non-rotating tubular sleeve disposed within said annular spindle and having a tubular bushing for supporting the workpiece adjacent the rotating tool elements, and means for removing said sleeve without disassembling said annular spindle to facilitate replacement of said bushing for accommodating workpieces of different diameters.

10. A machine as defined in claim 9 and including means defining an axially extending passage within said sleeve, and means for directing a cooling fluid through said passage directly to said tool elements.

11. A machine as defined in claim 1 wherein said annular spindle within said forming head includes an enlarged pulley portion surrounding said tool elements, and said spindle driving means comprise a flexible drive belt extending partially around said pulley portion.

12. A machine as defined in claim 1 and including track means extending transversely to the axis of said spindle and supporting said forming head for lateral movement from an operating position between said two workpiece feeding units to a retracted position to facilitate rapid access to said tool elements.

13. A machine adapted for turning a cylindrical workpiece to a precision predetermined outside diameter, said machine comprising a turning head including a tubular spindle supported for rotation on an axis, a plurality of angularly spaced cutting tool elements supported by said spindle for engaging the workpiece, belt drive means for rotating said spindle, a plurality of workpiece feeding units spaced axially with said turning head disposed between two said feeding units, each of said feeding units including a pair of opposing feed rollers having V-shape grooves and spaced to receive a workpiece therebetween, a pair of pivot members supporting said feed rollers for rotation on parallel spaced axes, means supporting said pivot members for pivotal movement on parallel spaced axes eccentric to the corresponding said axes of said feed rollers for changing the spacing between said feed rollers, gear means for simultaneously driving said feed rollers while said pivot members are pivoting, stop means for limiting the pivotal movement of said pivot members, and means including a power actuated lever for simultaneously engaging and pivoting said pivot members while said feed rollers are driven to effect movement of said driven feed rollers between corresponding retracted positions and workpiece gripping positions for feeding the workpiece through said turning head in precise alignment with the axis of said spindle.

14. A machine as defined in claim 13 wherein said turning head comprises a removable non-rotating tubular sleeve disposed within said tubular spindle, a tubular bushing supported within said sleeve adjacent said tool elements for supporting the workpiece after being turned, track means extending transversely to the axis of said spindle and supporting said turning head for lateral movement from an operating position between said two workpiece feeding units to a retracted position to facilitate rapid access to said tool elements and said sleeve for replacing said bushing.

15. A machine as defined in claim 14 and including means defining at least one axially extending passage within said tubular sleeve, and means for directing a cooling fluid through said passage directly to said tool elements.

16. A machine as defined in claim 14 wherein said tubular spindle within said turning head includes an enlarged integral pulley portion disposed adjacent said tool elements.

17. A machine adapted for precisely turning a cylindrical workpiece to a predetermined outside diameter, said machine comprising a forming head including a tubular spindle supported for rotation on an axis, a plurality of angularly spaced tool elements mounted on said spindle for engaging the workpiece, means for driving said spindle, a plurality of workpiece feeding units spaced axially with said forming head disposed between two said feeding units, each of said feeding units including a set of feed rollers spaced to receive a workpiece therebetween, means for simultaneously driving said feed rollers, power actuated means for moving said feed rollers while being driven to effect movement of said driven feed rollers between corresponding retracted positions and workpiece gripping positions for feeding the workpiece through said forming head, a non-rotating tubular sleeve disposed within said tubular spindle of said forming head and having a tubular bushing for supporting the workpiece adjacent the rotating tool elements, and means for axially removing said sleeve from said annular spindle to facilitate replacement of said bushing for accommodating workpieces of different diameters.

18. A machine as defined in claim 17 and including means defining an axially extending passage within said sleeve, and means for directing a cooling fluid through said passage directly to said tool elements.

19. A machine as defined in claim 17 wherein said tubular spindle includes an enlarged pulley portion adjacent said tool elements, and said spindle driving means comprise a flexible drive belt extending partially around said pulley portion.

20. A machine as defined in claim 17 and including track means extending transversely to the axis of said spindle and supporting said forming head for lateral movement from an operating position between said two workpiece feeding units to a retracted position to facilitate rapid access to said tool elements.

* * * * *